United States Patent
Jabbari et al.

(10) Patent No.: US 8,213,424 B2
(45) Date of Patent: *Jul. 3, 2012

(54) LABEL SWITCHED PACKET TRANSFER DEVICE

(75) Inventors: Bijan Jabbari, Washington, DC (US); Esmael Dinan, Herndon, VA (US); Rajiv Papneja, Billerica, MA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 224 days.

This patent is subject to a terminal disclaimer.

(21) Appl. No.: 12/609,556

(22) Filed: Oct. 30, 2009

(65) Prior Publication Data
US 2010/0278145 A1 Nov. 4, 2010

Related U.S. Application Data

(63) Continuation of application No. 11/419,286, filed on May 19, 2006, now Pat. No. 7,616,599, which is a continuation of application No. 09/956,466, filed on Sep. 20, 2001, now Pat. No. 7,061,896.

(60) Provisional application No. 60/234,167, filed on Sep. 20, 2000.

(51) Int. Cl.
*H04L 12/56* (2006.01)
*H04J 1/16* (2006.01)

(52) U.S. Cl. .......... 370/389; 370/252; 370/254
(58) Field of Classification Search .......... 370/252, 370/254, 329, 389
See application file for complete search history.

(56) References Cited

U.S. PATENT DOCUMENTS 6,973,057 B1 * 12/2005 Forslow .......... 370/328
2006/0233137 A1 * 10/2006 Dantu et al. .......... 370/331
* cited by examiner

*Primary Examiner* — John Pezzlo
(74) *Attorney, Agent, or Firm* — Fish & Richardson P.C.

(57) ABSTRACT

A device for connecting base station(s) to a cellular label switched network in a cellular network. The cellular network includes: base station(s), the connecting device(s); cellular label switched network(s); and service area(s). The base station(s) communicates with mobile terminals using wireless technology. The wireless technology uses a protocol layer architecture that includes at least one of the following: a wireless physical layer; a wireless medium access control protocol layer; a radio link control layer; and a network layer. The connecting device(s) include: a first interface to connect to the base station(s); a second interface to connect to cellular label switched network(s); and a label forwarding layer that: forwards packets between base station(s) and cellular label switched network(s); attaches label(s) to packets and removes label(s) from packets. A service area divided into a multitude of cells through which mobile terminals can move through and communicate with base station(s).

68 Claims, 7 Drawing Sheets

LABEL SWITCHED PACKET TRANSFER DEVICE

CROSS-REFERENCE TO RELATED APPLICATIONS

This application is a continuation of application Ser. No. 11/419,286, filed May 19, 2006, which is a continuation of application Ser. No. 09/956,466, filed Sep. 20, 2001, which claims the benefit of provisional patent application No. 60/234,167, filed on Sep. 20, 2000, which are hereby incorporated by reference.

BACKGROUND OF THE INVENTION

The present invention generally relates to the field of network packet transfer. More specifically, the present invention relates to packet transfer mechanisms in wireless cellular networks.

The increasing dependence on the Internet and the widespread use of wireless terminals have given rise to considerable interest in the development of a wireless Internet. In particular, such wireless networks are expected to provide efficient packet transfer and support multimedia applications. Of importance in the wireless segment is the flexibility in allocation of bandwidth and efficient use of radio resources. In the core networks, multi-protocol label switching is emerging as a technology to facilitate traffic engineering and internetworking. Label switched transfer is an extension to packet forwarding whereby short fixed length labels are attached to packets at an entry node to provide a path to an exit node. What is needed is an architecture, using label switching, to support wireless mobile terminals.

ATM has been used to a certain extent as a switching technology for backbone networks to support integrated services with QoS control. Considerable research has been carried out to extend ATM services to mobile terminals mostly with the assumption that ATM connections terminate at the wireless users. For example, Wireless-ATM (WATM), may extend the ATM signaling and control framework to support mobility. On the other hand, with the widespread use of Internet protocols, many schemes have been proposed to support mobility for IP wireless terminals within a connection-oriented framework of ATM networks.

Connection-oriented transfer mode requires segments of the connection to be released and reestablished, thus leading to significant complexity when the end points move. Connectionless mode, on the other hand, may simplify adaptation to changes in particular when mobility and hand-off are present. What is also needed is an architecture that takes advantage of both transfer modes without the complexity of Wireless-ATM.

The cellular industry needs an architectures that involve minimal requirements at the mobile terminal, and allows the mobile terminals to be interconnected to the backbone network. This architecture should include mechanisms for location and handoff management as well as label merging capability and fast rerouting schemes to support multilink techniques and mobility.

BRIEF DESCRIPTION OF THE SEVERAL VIEWS OF THE DRAWINGS

The accompanying drawings, which are incorporated in and form a part of the specification, illustrate an embodiment of the present invention and, together with the description, serves to explain the principles of the invention.

DETAILED DESCRIPTION OF THE INVENTION

The present invention provides a method and apparatus to support a hierarchical architecture which integrates wireless mobile terminals into networks such as the Internet. This architecture provides for efficient packet transfers over mobile wireless networks by efficiently allocating wireless resources. Label Switched packet forwarding facilitates traffic engineering and internetworking by attaching short fixed length labels to communications packets at an entry node to a wireless network to provide an efficient path to an exit node of the same wireless network. Forwarding mechanisms and limited broadcasting of reachability information may be used in managing and routing communications packets through wireless mobile networks. The present invention also supports multiple radio links between a mobile terminal and a multiplicity of base stations. Multi-link techniques are used to affect an efficient packet transfer and admission policy.

A path may be established between any two nodes of a network to carry datagram traffic. The connection between the two nodes may be known as a label switched path and the two nodes may be label switching routers. As disclosed, multi-protocol label switching may provide certain advantages of connection-oriented network while retaining efficiency of the datagram network.

Figure 1:
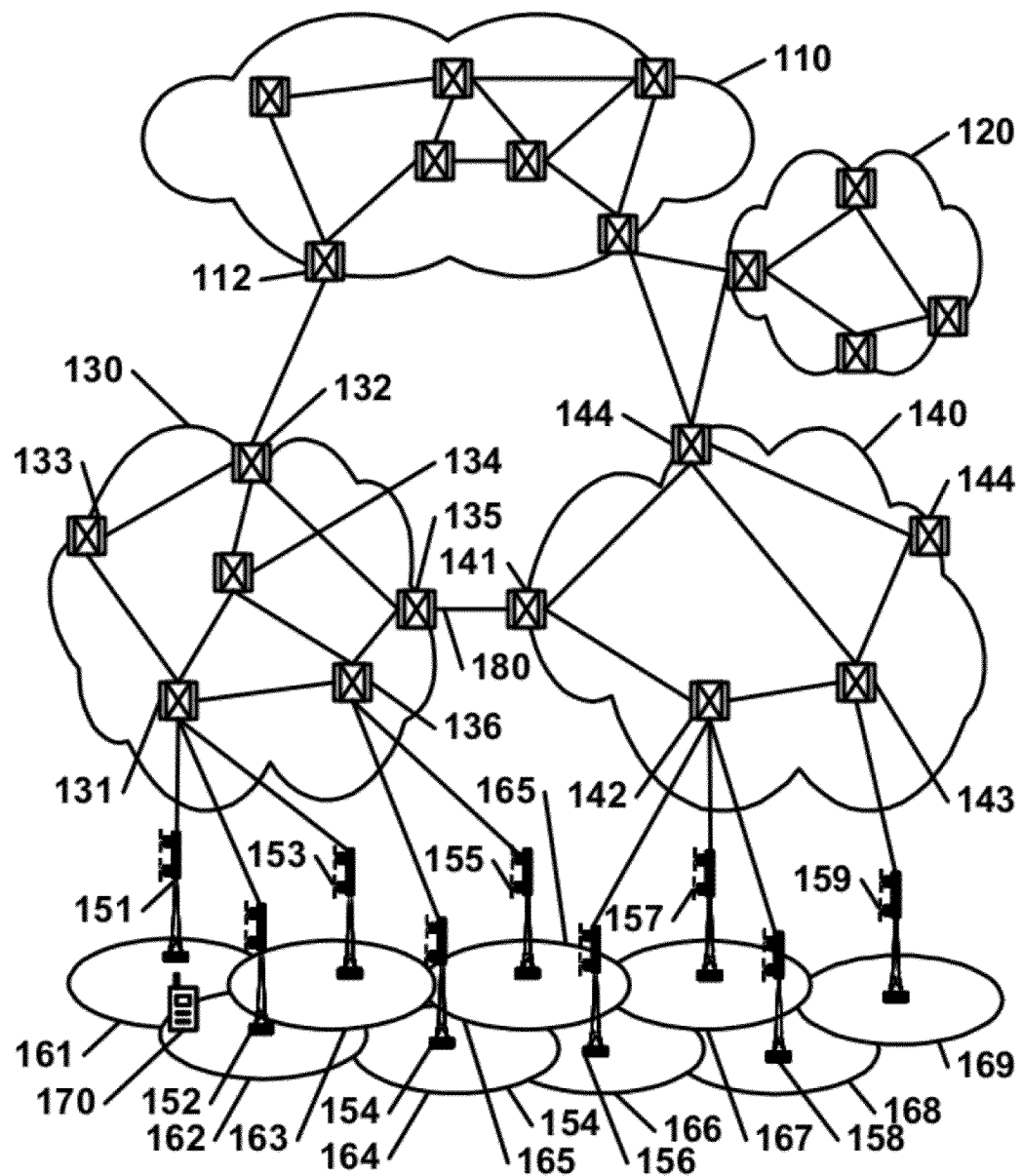
FIG. 1 is a diagram of an aspect of the present invention showing a hierarchical structure for wireless label switched networks.

An embodiment of the present invention showing a hierarchical structure for wireless label switched network is depicted in FIG. 1. Label Switching networks 130 and 140 are connected to a backbone network 110 and a fixed network 120. The network may include a multitude of base stations such as base stations 151, 152, 153, 154, 155, 156, 157, 158, and 159, connected to label switching nodes (LSN) such as 131, 136, 142 and 143, along with components of a standard multi-protocol label switching network, such as label switching routers. The label switching nodes (131, 136, 142 and 143) may provide services to the base stations (151, 152, 153, 154, 155, 156, 157, 158, and 159) and may also support fast handoff and location management mechanisms. The hierarchical architecture preferably extends label-switched paths to the base stations (151, 152, 153, 154, 155, 156, 157, 158, and 159), which in turn may support wireless users. The wireless users typically will use a mobile terminal 170 to communicate through the network. The architecture disclosed here may be independent of the underlying radio technology. The base station terminating the label-switched paths preferably have functions for forwarding packets between wireless terminals and label switching node interfaces.

Service areas may be divided into microcells (161, 162, 163, 164, 165, 166, 167, 168, and 169) with base stations (151, 152, 153, 154, 155, 156, 157, 158, and 159) connected to label switching nodes (131, 136, 142 and 143), which preferably provide control and concentrate base station traffic. A routing area may be defined to support the mobility of the users 170 and may store location information of the mobile terminals, such as 170, in the network. A routing area may consist of a set of cells with base stations connected to the same label-switching node. As illustrated, a first routing area consists of cells 161, 162, and 163 connected to node 131. A second routing area consists of cells 164, 165, and 166 connected to node 136. Location information may be updated when the mobile terminal 170 enters a new routing area. Since the geographical coverage of a routing area may be large compared to the size of the radio microcells (160, 161, 162, 163, 164, 165, 166, 167, 168, and 169), the rate of routing area handoff may be acceptably low. The present invention considers fast signaling among label switching routers and label switching nodes. That means, for example, that routing tables may be updated in a time much shorter than the frame duration in the radio link.

A connection may be made between a pair of the label switching nodes, where each of the pair of label switching nodes resides in separate cellular label switched networks. For example, node 135 which resides in cellular label switched network 130, and node 141 which resides in cellular label switched network 140, may be connected by connection 180.

Figure 2:
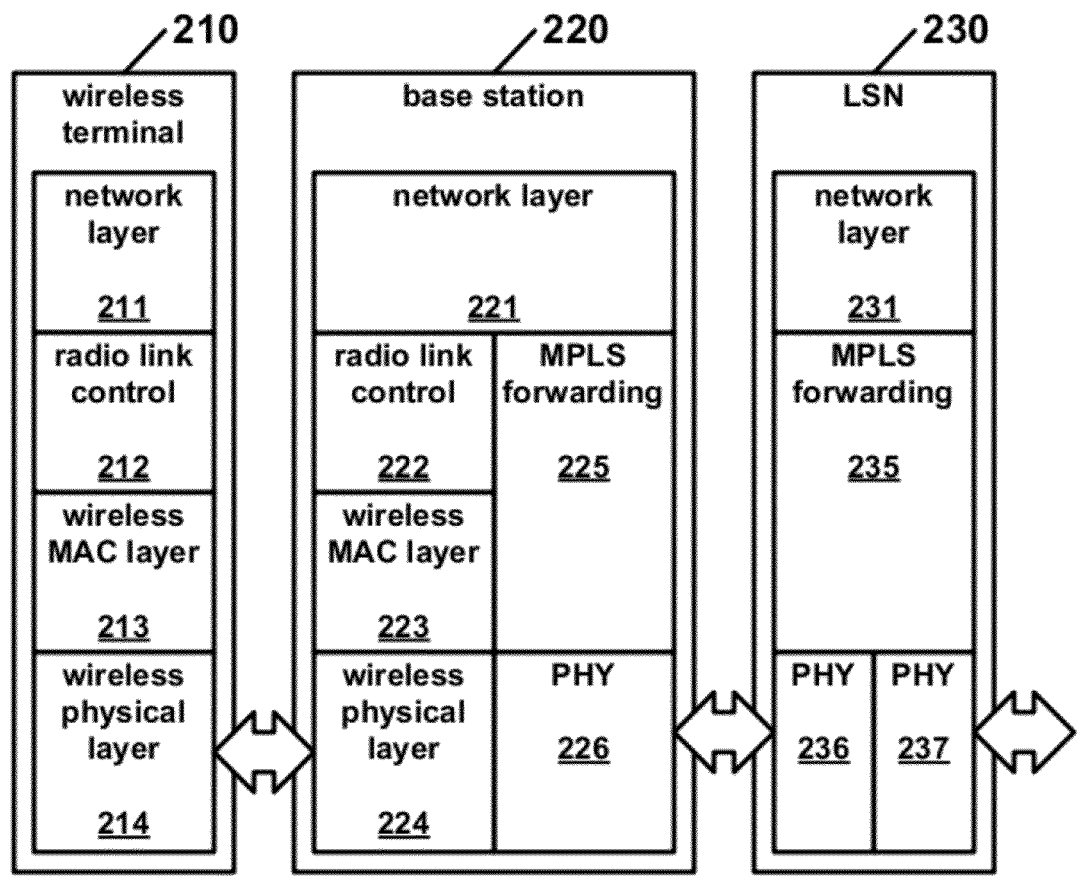
FIG. 2 is a diagram of an aspect of the present invention showing a wireless label switching protocol layer architecture.

FIG. 2 is a diagram of an aspect of the present invention showing a wireless label switching protocol layer architecture which includes a wireless terminal label switching protocol layer architecture 210, a base station label switching protocol layer architecture 220, and a label switching node label switching protocol layer architecture 230. The wireless terminal label switching protocol layer architecture 210 includes a network layer 211, a radio link layer 212, a wireless medium access control (MAC) layer 213, and a wireless physical layer 214. The base station label switching protocol layer architecture 220 includes a network layer 221, a radio link layer 222, a wireless medium access control layer 223, a wireless physical layer 224, a multi-protocol label switching forwarding layer 225, and a physical layer 226. The label switching node label switching protocol layer architecture 230 includes a network layer 231, and a multi-protocol label switching forwarding layer 235, and physical layers 236 and 237.

There are two main issues in the physical medium when wire line networks are extended to wireless terminals. Wireless media usually have a time-varying link quality and provide a point-to-multipoint broadcast environment, which may necessitate the development of a different media access scheme. The protocol layer architecture shown in FIG. 2 addresses these issues to enable the development of wireless label switched networks. The wireless medium access control layers 213 and 223 support transmission of different traffic classes by wireless terminals over radio links. The radio link control segments 212 and 222 may transform mobile packets into radio link frames and may use error mitigation mechanisms to enhance poor radio link quality. Radio link frames may be assigned to mobile terminals by radio link identifier. Base stations may reassemble the radio frames to data packets, attach the label and forward the labeled packet.

Location management preferably allows the network to keep track of mobile terminal user's current location and thus simplifies the forwarding of the incoming calls to the mobile terminal. Location management may also bring user's profile near to its location and allow the network to provide the user with subscribed services. No separate mobile terminal locating procedure prior to connection setup may be needed.

The present invention extends the current interior gateway protocols to the disclosed architecture supporting mobile terminal users. Link state routing protocols, such as IS-IS [8] or OSPF [9] in a multi-protocol label switching domain, may broadcast the network state to compute a path through the network topology. Once a path has been computed, signaling protocols may be used to establish a label switched path, and traffic that satisfies the forwarding equivalence class relationship may be sent down the label switched path. These paths may be computed based on topology state information database existing in label switching routers throughout the network and shared among neighbors.

Figure 3:
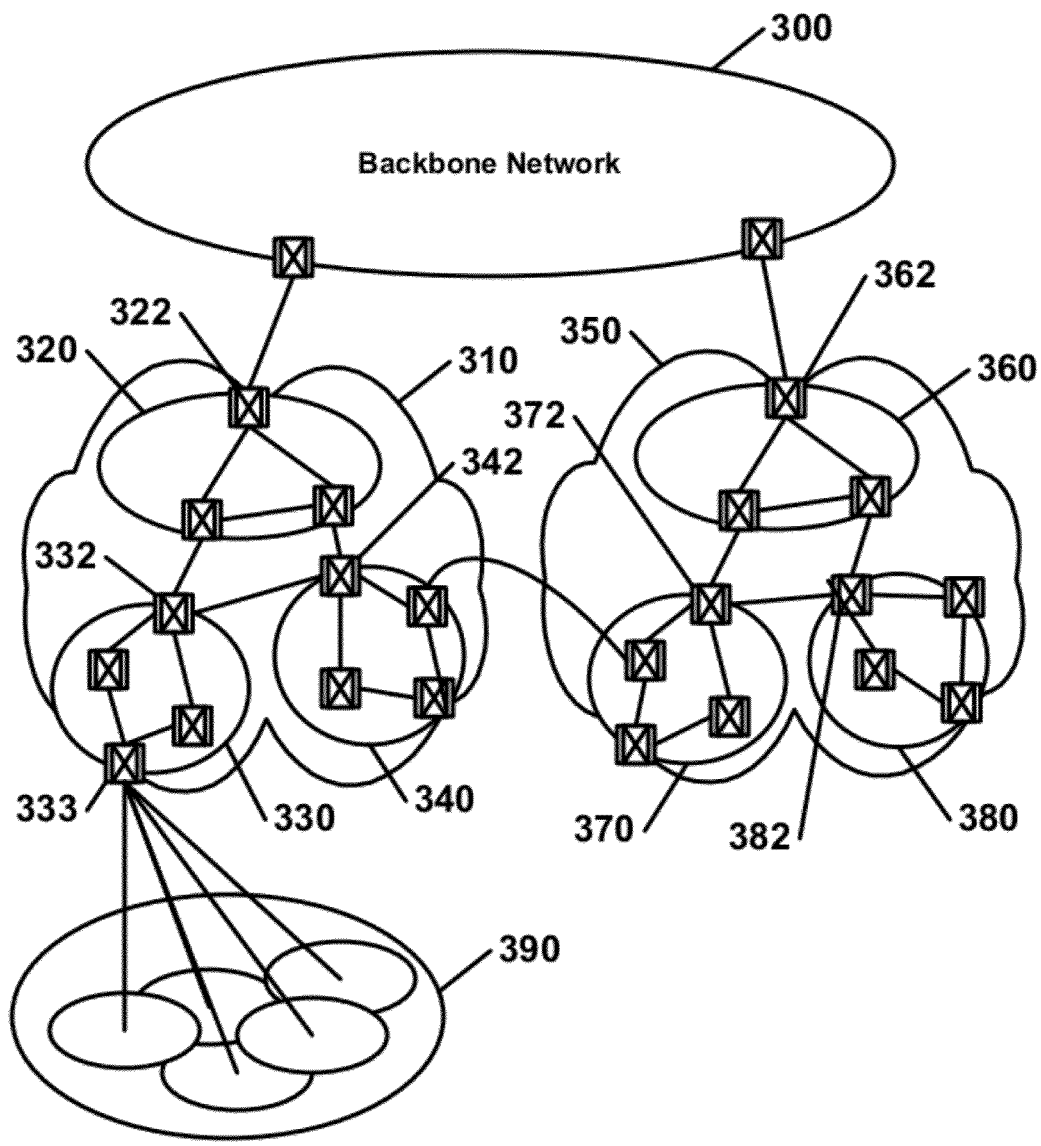
FIG. 3 is a diagram of an aspect of the present invention showing reachability information distribution for location management and routing.

FIG. 3 is a diagram of an aspect of the present invention showing reachability information distribution for location management and routing. As illustrated, backbone network 300 is connected to cellular label switching networks 310 and 350. Service area 390 is connected to cellular label switching networks 310 via node 333. Routing areas may effectively limit the registration traffic and routing updates arising due to cell crossovers by mobile terminals. To locate a mobile terminal, the network may find the routing area where the mobile terminal is located instead of tracing the base station to which the mobile terminal is connected. This may be done by updating the changes in the mobile terminal's routing area.

Some nodes in the cellular switching networks 310 and 350, may be organized to form groups of nodes. The nodes may include label switching routers and label switching nodes. For example, cellular label switching network 310 as shown is organized into groups 320, 330 and 340. Likewise, cellular label switching network 350 as shown is organized into groups 360, 370 and 380. To further reduce the routing updates, one node among the group may be represented in the network to share topology information of its group. In cellular label switching network 310, node 322 is representing group 320, node 332 is representing group 330, and node 342 is representing group 340. In cellular label switching network 350, node 362 is representing group 360, node 372 is representing group 370, and node 382 is representing group 380. These representatives constitute the next higher layer and they may be further grouped to form a multi-layer architecture covering the whole cellular label switched network. Note that as shown, nodes 322 and 362 may be label edge routers. There may be a trade-off between the propagation of the information to the higher layers and the amount of routing updates needed for the location management. The highest level in which the location information is distributed may define the reachability region. The topological state updates may be propagated within the reachability region to indicate where the mobile terminals are located and to enable the label switching routers to have exact location information about the mobile terminals.

In case of an incoming call for a mobile terminal, there are two possibilities; either the caller is in the same reachability region as the mobile terminal, or the caller is outside. In the former case, the network may locate the mobile terminal using the location updates in the label switching routers and label switching nodes. Therefore, incoming packets may be directly delivered to a mobile terminal using a shortest path algorithm. In the latter case, the path set up may be directed to a mobile terminals home. Here, there are two further possibilities, whether the called mobile terminal is within its home reachability region or the called mobile terminal is outside. In the former case, the call may be directly delivered to a mobile terminal since all the label switching routers have its exact location information. In the latter case, the path setup may be directed towards the home of the called mobile terminal and it may then be forwarded by the home to the mobile terminal's current location.

Groups may maintain identical topological databases (reachability updates). The area's topology may be invisible to the entities outside the area. Area border nodes may be responsible for inter-area routing. This hierarchy may limit traffic due to the distribution of the reachability information among nodes in a particular area and in the complete autonomous system.

In fixed networks, after a connection has been established, the connection path may not change unless there is a link or a node failure. This situation is no longer valid in the mobile networks where the end users are continuously moving. Due to this behavior, the path to the mobile terminal may need to be rerouted based on its current location. A handoff is the process of rerouting a path as a mobile terminal moves. The handoff process dealing with the connection rerouting may consist of three steps. First, finding a path and establishing a label switched path to the new base station; second, enabling the mobile terminal to receive and transmit via both old and new base stations when it is in the diversity area (area covered by both base stations); and third, shifting the data path at the crossover switch to the new label switched path, thus extending the traffic flow to the mobile terminals node when it has completely moved under the new base station's coverage.

Figure 4:
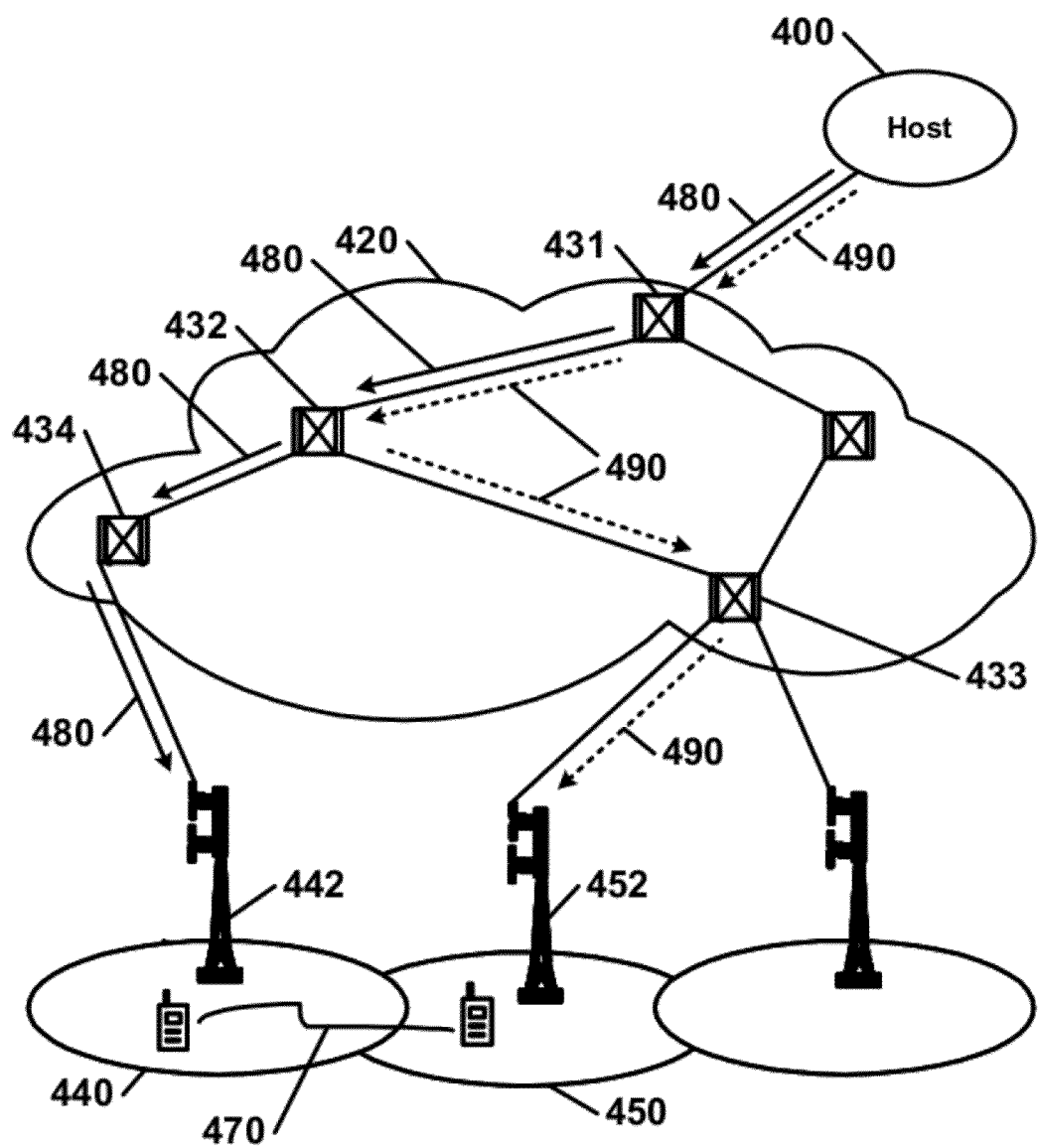
FIG. 4 is a block diagram of an aspect of the present invention showing rerouting of label switched paths during handoff from a first base station to a second base station.

The present invention may handoff execution in a cellular label switched network 420 using at least the following two rerouting schemes as illustrated in FIG. 4, which is a block diagram of an aspect of the present invention showing rerouting of label switched paths during handoff from a first base station 442 to a second base station 452. A first rerouting scheme involves dynamic rerouting. A second rerouting scheme involves rerouting by using pre-established paths.

Dynamic routing is based on the modification of an old path to find a new (and preferably optimal) path to the new location of the mobile terminal user. This scheme involves searching for the last common node of the old and new paths, and then switching the traffic at the common node to the new path. This common node is termed as the crossover switch and this mechanism may be called crossover switch discovery.

As illustrated, the mobile terminal 470, in communication with a host 400, moves from a first region 440 covered by the first base station 442 to a second region 450 covered by a second base station 452. To effectuate a handoff from first base station 442 to second base station 452, a first path 480 is switched to second path 490. The old label switched path tunnel 480 (routed from node 431 to node 432 to node 434 to first base station 442) may be rerouted from the crossover switch 432 to the second base station 452. The first subpath (node 432 to node 434 to second base station 442) may be torn down after the data stream is successfully mapped to the new subpath (node 432 to node 433 to second base station 452). It may be desirable that the traffic is not affected during rerouting, and that there is no adverse impact on the network. The present invention may adapt the policy of make-before-break as it exists in the fixed multi-protocol label switching network (e.g., using RSVP as the signaling protocol). The smooth rerouting of the traffic may require establishment of a new label switched path tunnel and transferring the traffic from the old label switched path 480 to the new label switched path 490 before tearing down the old label switched path 480. The two label switched paths may share the resources along the paths in common. Over the radio links additional messages between the base stations and mobile terminal may be exchanged to complete handoff process.

Rerouting by using pre-established paths involves setting of a pre-established tree between the base stations, 442 and 452, located in the region of influence of the mobile terminal 440 and 450, and some common node 432 (where these paths converge) prior to handoff. When the user moves from the first base station 442 to the second base station 452, the network selects different branches of the tree for communication.

Figure 5:
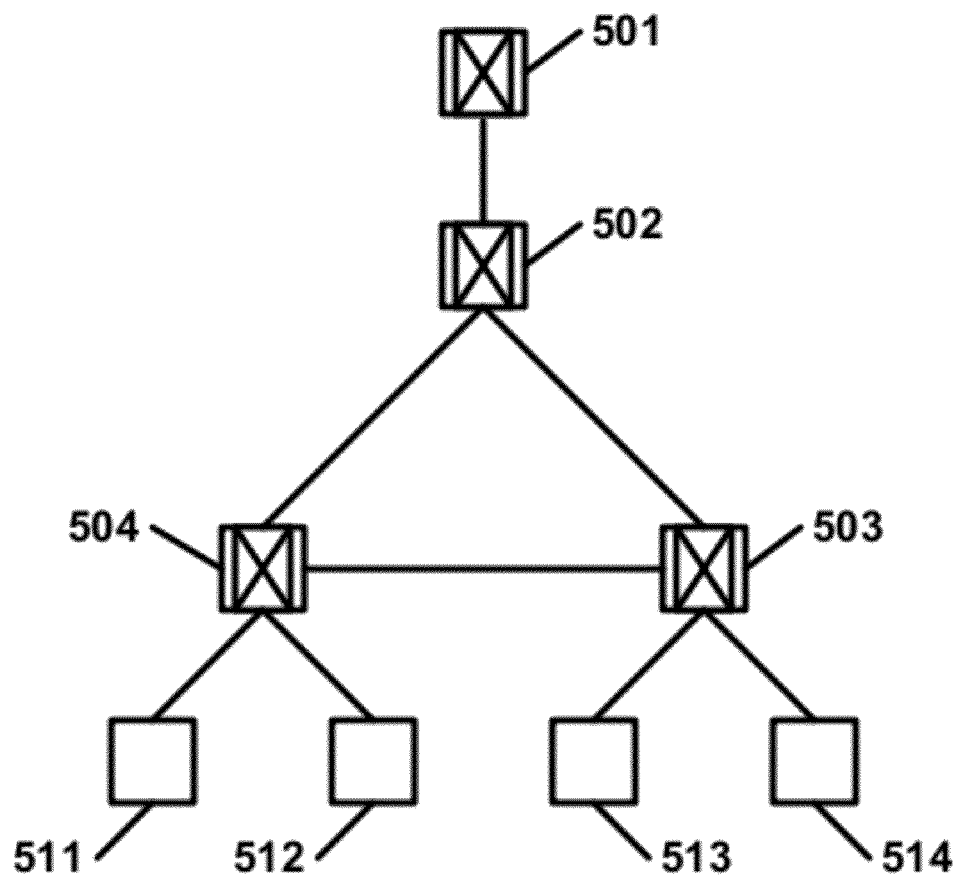
FIG. 5 is a block diagram of an aspect of the present invention showing a label switched path tree in a cellular label switched network.

FIG. 5 is a block diagram illustrating an aspect of the present invention showing how a label switched path tree may be established in a cellular label switched network. Label switched paths may be exploited to accommodate high rate of handoff among the base stations in a given geographical area (region of influence of the mobile terminal). The root of the tree is a node 502 may be a label switching router and is connected to node 501. The leaves of the tree may be base stations 511, 512, 513, and 514. Nodes 503 and 504 are branch nodes. This tree is similar to point to multipoint connection tree in which only one path is in use at a time. When a mobile terminal is admitted to the connection tree, a call setup procedure may consist of two phases. The initial phase may include establishment of paths from the root of the tree (node 502) to the other end of the connection (node 511, 512, 513, or 514) and may be maintained as long as the mobile terminal remains within the same tree. The second phase may include setting of the paths within the connection tree (root and the base station). Two label switched path identifiers may be allotted to the label switched path between the base station and the root of the tree (one in each direction). Also, within the multi-protocol label switching framework, and with certain extensions to the existing signaling protocol bi-directional tunnels may be established as a single process, between the base stations (node 511, 512, 513, or 514) and the root (node 502) of the tree.

When a mobile terminal who is already admitted to a connection tree wishes to handoff to another base station in the same geographical area (covered by the same tree), it may simply begin transmitting radio packets to the new base station and the traffic may be further forwarded to the destination through the fixed network. After the handoff, the root of the tree may receive the packets from the same mobile terminal with a new label and a different label switched path identifier. The root node may update its routing tables so that future packets may be delivered to the new base station of the given mobile terminal. This may mark the completion of the handoff process. If the mobile terminal reaches the edge of the geographical area covered by the same tree, it may request a tree handoff. Since the area covered by the tree may be large, tree handoffs may be less frequent.

Experience gained in the design and planning of cellular systems indicates that there may be a considerable amount of diversity areas among cell segments. In a diversity area, a mobile terminal may be in an overlapping area wherein the mobile terminal may receive and transmit radio packets from and to two or more base stations. Transmission and handoff procedures in diversity areas may be important because they can affect the communication quality during handoff and change the overall system capacity. The present invention expands upon multilink techniques, in which a mobile terminal in the diversity area may establish packet links to a plurality of base stations capable of communicating to it. The network may balance the traffic between the links based on the link quality and system available capacity.

Figure 6:
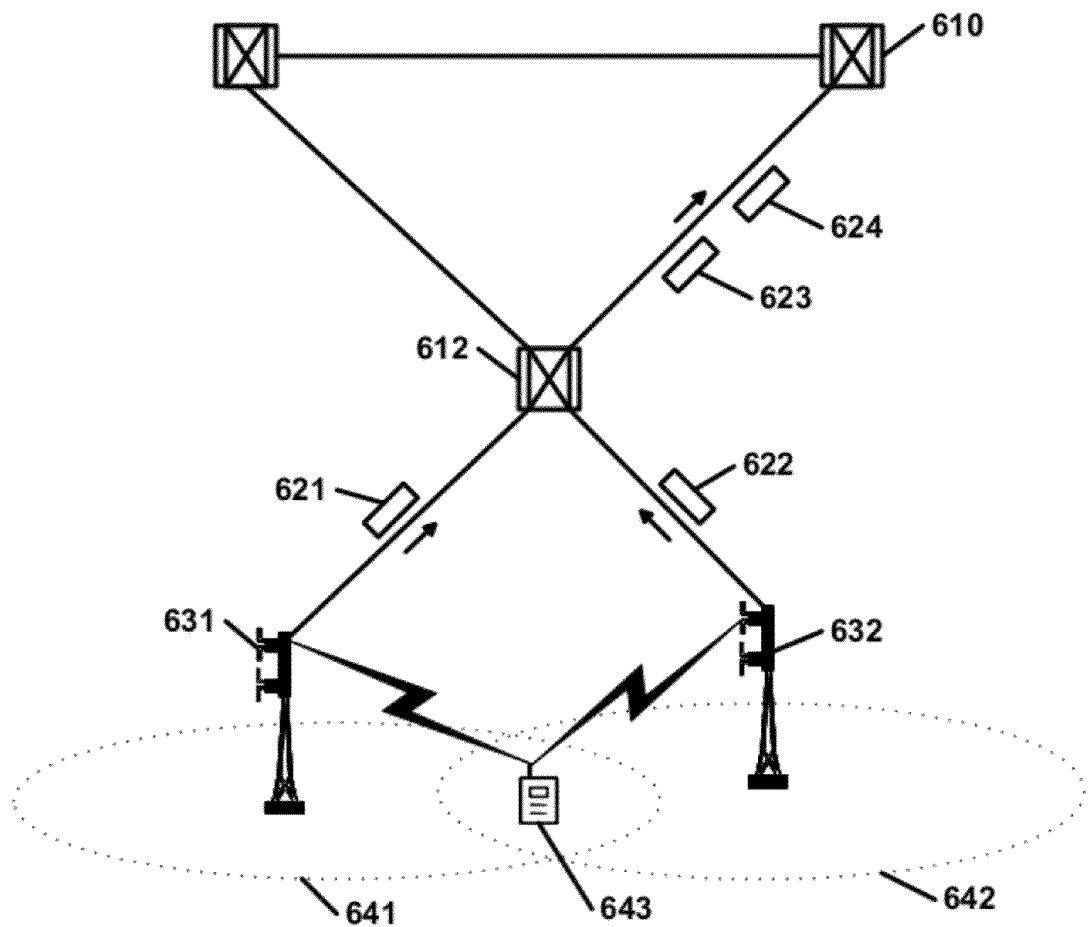
FIG. 6 is a block diagram of an aspect of the present invention showing multilink and label merging for users in diversity areas.

FIG. 6 is a block diagram of an aspect of the present invention showing multilink and label merging for users in diversity areas. The present invention may support multilink techniques that allow multiple parallel label switched path tunnels between nodes and the traffic between the nodes to be mapped to the label switched path tunnels according to a local policy. In addition, the present invention provides for label merging. Label merging occurs when a node such as a label switching router receives multiple packets through different incoming interfaces or with different labels forwarding the multiple packets over the same outgoing interface with the same label.

Label merging occurs when a node 612 such as a label switching router receives a first packet 621 and a second packet 622. FIG. 6 shows how this capability may be exploited in an uplink scenario. Mobile terminal 643 may transmit a first packet 621 and a second packet 622 to both a first base station 631 and a second base station 632. The first base station 631 may forward packet 621 to node 612 with a first label. Likewise, the second base station 632 may forward packet 622 to the same node 612 with a second label. Node 612 may act as a merging point, and forward both the first packet 621 and the second packet 622 with the same label as new first packet 623 and new second packet 624 to upstream node 610 (and then to a destination). In a downlink scenario the node may establish two separate label switched paths (one with the first base station 631 and another with the second base station 632) to a same destination, such as mobile terminal 643. The load may be balanced on these label switched paths dynamically based on the local policies.

The Handoff process in a pre-established path tree may require admission control of mobile terminal connections to the tree since, once a mobile terminal is admitted to the connection tree, it may freely hand-off to any base station within the connection tree. This may lead to overloading or congestion at a given base station if the number of mobile terminals seeking access to the network through the given base station exceeds the capacity of the base station. The purpose of admission control is to limit the number of mobile terminals attached to the tree at any given time to prevent the overloading of the base station and maintaining the desired QoS.

Here, consider base station overload probability as a QoS parameter, which is controlled by connection tree admission control. Consider a connection tree similar to the one shown in FIG. 5. Assume that there are N users admitted to the connection tree and each of them is free to select any of the base stations in the connection tree, then the probability that there are i connections established with a particular base station, Pi, may be given by binomial distribution:

$$P_i = \binom{N}{i}\left(\frac{1}{B}\right)^i\left(\frac{B-1}{B}\right)^{N-i} = \binom{N}{i}\left(\frac{1}{B-1}\right)^i\left(\frac{B-1}{B}\right)^N \quad (1)$$

B is the number of base stations in the connection tree and 1/B is the probability that a mobile terminal is communicating with a particular base station. If a base station can support up to m connections, the probability of overloading may be given by $$P_o = \sum_{i=m+1}^{N} P_i = \left(\frac{B-1}{B}\right)^N \sum_{i=m+1}^{N} \binom{N}{i}\left(\frac{1}{B-1}\right)^i \quad (2)$$

The overloading probability may be improved by the use of a multilink technique. Users in the diversity areas may communicate with both base stations. Considering a simple algorithm in which users in the diversity areas first request for a connection from the base station with the lower load. In other word, if a base station is overloaded by i>m connection requests, it transfers i−m calls to the neighboring base stations. This is possible if at least i−m mobile terminals are in the diversity areas and neighboring base stations have enough capacity to support them. Let us consider two neighboring cells (as shown in FIG. 6), in which a mobile terminal is in a diversity area with probability Pd. Then the overlapping probability may be re-evaluated as follows:

$$P_o = \sum_{i=m+1}^{2m} P_i \times (1 - P_t(i-m)) + \sum_{i=2m+1}^{N} P_i \quad (3)$$

where Pt(i−m) is the probability that i−m calls are successfully transferred to the other base station and it may be calculated as follows:

Pt(i−m)=P (number of mobile terminals in diversity>i−m/i>m)×P(i<2m−i)

and then $$P_t(i-m) = \left\{\sum_{k=i-m}^{i}\binom{i}{k}P_d^k(i-P_d)^{N-i}\right\} \times \sum_{i=0}^{2m-i} P_i \quad (4)$$

Figure 7:
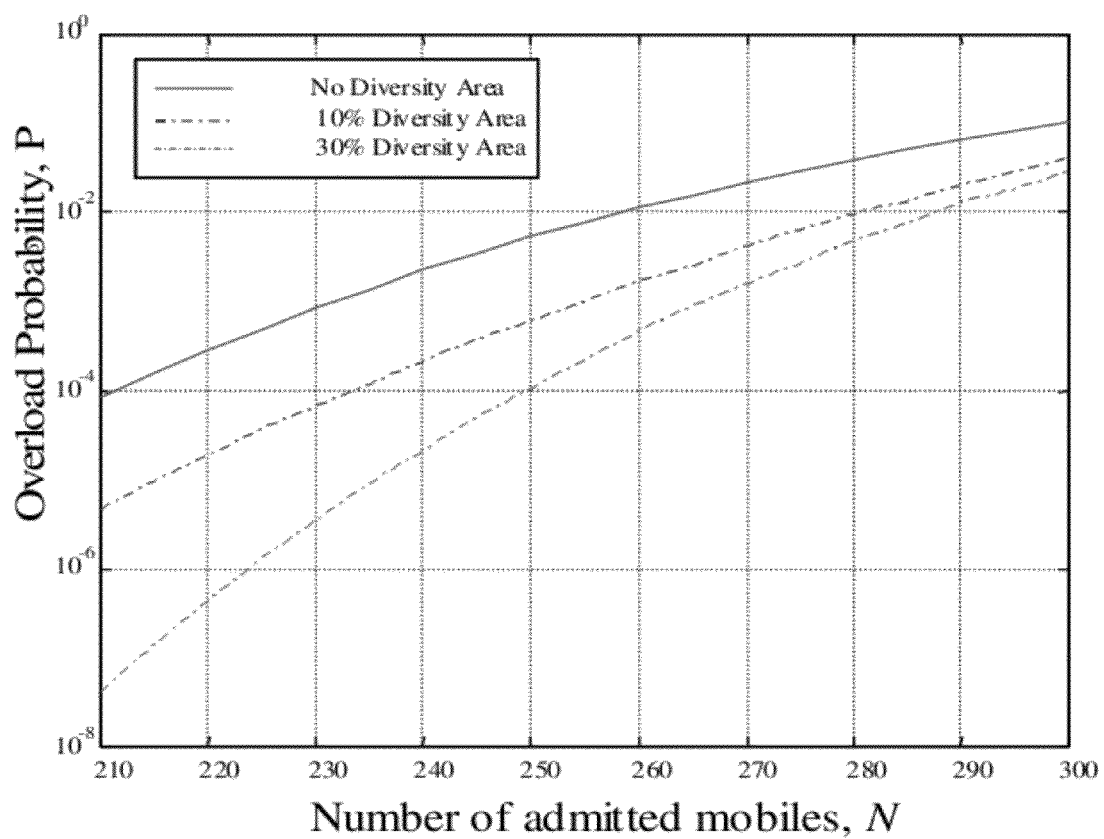
FIG. 7 is a graph showing overload probability versus the number of admitted mobile terminals for different percentage of diversity areas.

The analysis may be more complex when more than two cells are considered. A simulation study may be performed to measure the effect of load balancing capability on overload probability. Considering a connection tree containing B=7 base stations, each capable of supporting m=50 users, FIG. 7 shows the effect of the diversity areas on the performance of the call admission policy. Overload probability may significantly decrease by using multilink technique.

A hierarchical architecture has been disclosed which may provide services to wireless mobile terminals using label switched networks. Location management and routing issues are addressed by using forwarding mechanisms and limited broadcasting of reachability information. The present application discloses how multi-protocol label switching label merging and rerouting capabilities may be used to support multilink technique and mobility. Also disclosed are multilink techniques that may improve the performance of the admission policy by an order of magnitude depending on the diversity areas.

A cellular network as per the present invention may comprise a service area divided into a multitude of cells through which one or more mobile terminals may move through. Base stations capable of communicating with the mobile terminals may be deployed in each of the multitude of cells for forwarding packets between the base stations and the mobile terminals. The cellular label switched network may also include a plurality of nodes topologically connected. At least one of the nodes is preferably a label switching node. A connection between base stations and at least one label switching node may allow for forwarding packets between the base stations and the label switching nodes.

A label switched path for directing packets between a pair of locations may be determined. Each location in the pair is preferably a node or a base station. A label may then be attached to the packets. The packets may include the label switched path and control information. Labels may be removed from the labeled packet by a node and interpret by the nodes to determine how to forward the packet along the label switched path.

At least one of the label switching nodes is preferably a label edge node. At least another of the of the label switching nodes is preferably a device, a switch or a router. The nodes in a system may include but are not to be limited to devices, switches and routers.

In a cellular network as per the present invention, any node such as label edge routers may be an ingress node, an egress node, or an ingress/egress node.

The label switched nodes preferably provide base station control information to the base stations, may concentrate traffic to the base stations, may provide support for fast hand-off of the mobile terminals to the base stations, and may further provide location management information to the base stations.

Connections may also be made between a pair of the label switching nodes, where each of the pair of label switching nodes resides in separate cellular label switched networks. This allows for multiple networks to be coupled, thus forming a larger cellular network.

Base stations preferably use wireless technology to communicate with the mobile terminals. The wireless technology may utilize radio technology, optical technology, or other type of wireless technology where data may be communicated between two points without the assistance of wire.

The network may use optical technology at other locations too, including any of the nodes or connections. The optical technology may include free space optical switching technology or guided optical switching technology.

The wireless technology may use a protocol layer architecture which may include but is not limited to a wireless physical layer, a wireless medium access control protocol layer, a radio link control layer, or a network layer. These elements may be found on both the base stations and wireless terminals. The radio link controls may segment mobile packets into radio link frames which may be identified by radio link identifiers. Various techniques known to those skilled in the art may be employed for error mitigation to enhance poor radio link quality. The base station may reassemble radio frames received from mobile terminals into packets. One way to accomplish this includes attaching the label to the packets and then forwarding the labeled packets to the label switching node. Likewise, the base station may also process packets traveling in the opposite direction. When the base station receives labeled packets from a label switching node, the base station may segment the labeled packets into radio frames, remove the labels from the labeled packets, and then forwards the radio frames to the mobile terminal.

The label switched path may be determined by information derived from broadcasting a network state through the network topology using a routing protocol, and then establishing the label switched path using a signaling protocol. The routing protocol may be a link state routing protocol, a vector space routing protocol, or any other known routing protocol. The label switched path may also be determined by a topology database. In some embodiments of the present invention, the topology database may exist in a multitude of the nodes. It may even be preferable for the topology database to be shared among its neighbor nodes.

The cellular network may further include a plurality of routing areas, wherein each of the routing areas include a set of cells whose base stations are connected to the same label switched node. These routing areas may further include mobile terminal location information. The mobile terminal location information is preferably updated whenever the mobile terminal enter a new routing area. The mobile may be located by determining which of the plurality of routing areas the mobile terminal is located.

The cellular labeled switched network may be a multi-layer cellular labeled switched network. This multi-layer cellular labeled switched network may be divided into a plurality of smaller groups, where each of the smaller groups consisting of a multiplicity of label switched nodes have topological databases. Some or all of these topological databases may be maintained to be identical, and may further include reachability updates. These topologies of the smaller groups may also be invisible to entities outside the smaller group. At least one of the nodes in at least one of the smaller groups may be an area border node responsible for inter-group routing. Similarly, when there are a multitude of cellular labeled switched networks, at least one of the nodes in each of the multitude of cellular labeled switched networks may be an area border node responsible for inter-cellular labeled switched network routing.

The present invention includes a mobile terminal hand-off mechanism including the steps of finding a new data path from the mobile to a new base station, using the new data path to establish a new label switched path to the new base station, enabling the mobile to receive and transmit to both the old base station and the new base station when the mobile is in a diversity area, shifting the data path at a crossover node to the new label switched path; and extending traffic flow to new base station when the mobile has completely moved under the new base station's coverage.

Label merging may be accomplished by receiving two or more packets with different labels, and forwarding the two or more packets over a single outgoing interface with a singular label. At least two of the received packets may be received through different incoming interfaces of at least one of the label switching nodes. Further, the packets may be received from at least one of the base stations.

A label switched path tunnel may be used between a pair of the nodes along a label switched path. Traffic between the pair of nodes may be mapped through the label switched path tunnel according to a local policy. The local policy may specify how may packets may travel through the tunnel at one time, or may specify what kind of traffic may travel through the tunnel. Any type of traffic decision may be made by the policy. It may be preferable if at least one of the nodes is capable of establishing at least two separate label switched path tunnels to the other node.

Traffic loading may be balanced on label switched paths dynamically based on local policies. A label switched path may be rerouted by establishing a new label switched path tunnel, transferring traffic from the label switched path to the new label switched path, and then removing the label switched path. Resources may be shared between the label switched path and the new label switched path along their common paths. The label switched path may also be rerouted using pre-established paths. This may accomplished by: setting a pre-established tree between the base stations located in the region of influence of the mobile and a common node prior to handoff; and selecting a different tree branch for communication when the mobile terminal moves from one of the base station to the another one of the base stations.

Additional messages between the base stations and the mobile may be exchanged to complete handoff and the cell selection process. The cell selection process may include cell reselection. In addition, whenever a mobile terminal reaches the edge of a geographical area covered by an active tree, the mobile terminal may requests a tree handoff.

In an embodiment of the present invention, the mobile terminal may receive and transmit radio packets to and from a multitude of base stations. When a mobile terminal is in a diversity area, the mobile terminal may establish packet links to a multitude of base stations capable of communicating to the mobile terminal.

The network may consider factors when balancing traffic. Examples of factors that may be considered include link quality and system availability.

During a hand-off in a pre-established path tree, the hand-off mechanism utilize admission control of mobile connections to the tree. An overload probability value may also be used as a factor in the admission control. Determination of the overload probability value may include the number of users, the number of base stations, and the number of connections each base station can support.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated.

What is claimed is:

1. A cellular network comprising:
   (a) at least one base station, said at least one base station configured to use wireless technology to communicate with mobile terminals, said wireless technology using a protocol layer architecture including at least one of the following:
      (1) a wireless physical layer;
      (2) a wireless medium access control protocol layer;
      (3) a radio link control layer; and
      (4) a network layer;
   (b) at least one connecting device, said connecting device including:
      (1) a first interface configured to connect to said at least one base station;
      (2) a second interface configured to connect to said at least one cellular label switched network; and
      (3) a label forwarding layer configured to:
         (i) forward packets between said at least one base station and a cellular label switched network;
         (ii) attaching a label to at least some of said packets, said label including:
            (1) a label switched path identifier, the label switched path identifier configured to identify a label switched path for directing packets between a pair of locations, said pair of locations consisting of:
               (a) nodes; and
               (b) said connecting device; and
            (2) control information; and
         (iii) remove said label from at least some of said packets;
   (c) said at least one cellular label switched network, said at least one cellular label switched network including a plurality of nodes, said plurality of nodes:
      (1) topologically connected; and
      (2) including at least one label switching node, said at least one label switching node configured to:
         (i) interpret said label; and
         (ii) forward said packets along said label switched path,
   wherein said connecting device and said at least one base station reside outside of said at least one cellular label switched network; and
   (d) at least one service area divided into a multitude of cells through which one or more of said mobile terminals can move through, said at least one base station configured to communicate with said mobile terminals deployed in said at least one service area for forwarding packets between said base station and said mobile terminals.

2. The cellular network according to claim 1, wherein said connecting device and said at least one base station are co-located.

3. The cellular network according to claim 1, wherein said at least one label switching node provides base station control information to said connecting device.

4. The cellular network according to claim 3, wherein base station control information provided by said at least one label switching node is forwarded to said at least one base station by said connecting device.

5. The cellular network according to claim 1, wherein said at least one label switching node provides support for a hand-off of said mobile terminals to said at least one base station.

6. The cellular network according to claim 1, wherein location management information provided by said at least one label switching node is forwarded to said at least one base station by said connecting device.

7. The cellular network according to claim 1, wherein said label switched path is determined using a routing protocol.

8. The cellular network according to claim 7, wherein said routing protocol is at least one of the following:
   (a) a link state routing protocol; and
   (b) a vector space routing protocol.

9. The cellular network according to claim 1, wherein said label switched path is established using a signaling protocol.

10. The cellular network according to claim 1, wherein said label switched path is determined by a topology database.

11. The cellular network according to claim 1, wherein a topology database exists in a multitude of said nodes.

12. The cellular network according to claim 1, further including label merging wherein said connecting device is configured to:
   (a) receive two or more packets with different labels; and
   (b) forward said two or more packets over a single outgoing interface with a singular label.

13. The cellular network according to claim 12, wherein said two or more packets are received from said at least one base station.

14. The cellular network according to claim 1, wherein said label switched path is rerouted by:
   (a) establishing a new label switched path tunnel;
   (b) transferring traffic from said label switched path to said new label switched path; and
   (c) removing said label switched path.

15. A wireless network comprising:
   (a) at least one base station, said at least one base station configured to use wireless technology to communicate with wireless terminals, said wireless technology using a protocol layer architecture including at least one of the following:
(1) a wireless physical layer;
(2) a wireless medium access control protocol layer;
(3) a radio link control layer; and
(4) a network layer;
(b) at least one connecting device, said connecting device including:
(1) a first interface configured to connect to at least one of said at least one base situation;
(2) a second interface configured to connect to at least one wireless label switched network; and
(3) a label forwarding layer configured to:
(i) forward packets between said at least one base station and said wireless label switched network;
(ii) attaching a label to at least some of said packets, said label including:
a) a label switched path identifier, the label switched path between a pair of locations, said pair of locations consisting of:
1) nodes; and
2) said connecting device; and
b) control information; and
(iii) remove said label from at least some of said packets;
(c) said at least one wireless label switched network, said at least one wireless label switched network including a plurality of nodes, said plurality of nodes:
(1) topologically connected; and
(2) including at least one label switching node, said at least one label switching node configured to:
(i) interpret said label; and
(ii) forward said packets along said label switched path,
wherein said connecting device and said at least one base station reside outside of said at least one wireless label switched network; and
(d) at least one service area; said at least one base station configured to communicate with said wireless terminals deployed in said at least one service area for forwarding packets between said base station and said wireless terminals.

16. The wireless network according to claim 15, wherein said connecting device and said at least one base station are co-located.

17. The wireless network according to claim 15, wherein said label switched path is determined using a topology database.

18. A wireless network comprising:
(a) at least one base station, said at least one base station configured to use wireless technology to communicate with wireless terminals, said wireless technology using a protocol layer architecture including at least one of the following:
(1) a wireless physical layer;
(2) a wireless medium access control protocol layer;
(3) a radio link control layer; and
(4) a network layer;
(b) at least one connecting device, said connecting device including:
(1) a first interface configured to connect to at least one of said at least one base station;
(2) a second interface configured to connect to at least one label switched network; and
(3) a label forwarding layer configured to:
(i) forward packets between said at least one base station and said label switched network;
(ii) attaching a label to at least some of said packets, said label including:
(1) a label switched path identifier, the label switched path identifier configured to identify a label switched path for directing packets between a pair of locations, said pair of locations consisting of:
(a) nodes; and
(b) said connecting device; and
(2) control information; and
(iii) remove said label from at least some of said packets;
(c) said at least one label switched network, said at least one label switched network including a plurality of nodes, said plurality of nodes:
(1) topologically connected; and
(2) including at least one label switching node, said at least one label switching node configured to:
(i) interpret said label; and
(ii) forward said packets along said label switched path; and
(d) at least one service area, said at least one base station configured to communicate with said wireless terminals deployed in said at least one service area for forwarding packets between said base station and said wireless terminals,
wherein said connecting device and said at least one base station are co-located.

19. A cellular network comprising:
(a) at least one service area including cell sites through which mobile terminals can move, the cell sites including at least one base station configured to communicate with said mobile terminals for forwarding packets between said base station and said mobile terminals;
(b) a base station that is located in one of the cell sites and configured to use wireless technology to communicate with mobile terminals, said wireless technology using a protocol layer architecture including at least one of the following:
(1) a wireless physical layer;
(2) a wireless medium access control protocol layer;
(3) a radio link control layer; and
(4) a network layer;
(c) a connecting device located in the cell site and including:
(1) a first interface configured to connect to said base station;
(2) a second interface; and
(3) a label forwarding layer configured to:
(i) attach a label to at least some of said packets, said label including:
(1) an identifier configured to identify a label switched path for directing packets between a pair of locations; and
(2) control information; and
(ii) remove a label from at least some of said packets; and
(d) at least one cellular label switched network that is connected to the second interface and that includes at least one label switching node that is configured to:
(i) interpret said label; and
(ii) enable communication of said packets over said label switched path, wherein the label forwarding layer is configured to enable communications of packets between said base station and said cellular label switched network.

20. A wireless network comprising:
a) at least one service area including sites in which wireless terminals are deployed, each site including at least one base station for forwarding packets between said base station and the wireless terminals;
(b) a base station located in one of the sites and configured to use wireless technology to communicate with wireless terminals, said wireless technology using a protocol layer architecture including at least one of the following:
(1) a wireless physical layer;
(2) a wireless medium access control protocol layer;
(3) a radio link control layer; and
(4) a network layer;
(c) a connecting device located in the site and including:
(1) a first interface configured to connect to said base station;
(2) a second interface; and
(3) a label forwarding layer configured to:
(i) attach a label to at least some of said packets, said label including:
1) an identifier configured to identify a label switching path for directing packets between a pair of locations; and
2) control information;
(ii) remove a label from at least some of said packets; and
(d) at least one wireless label switched network that is connected to the second interface and that includes at least one label switching node that is configured to:
(ii) interpret said label; and
(iii) enable communications of said packets over said label switched path,
wherein the label forwarding layer is configured to enable communications of packets between said base station and said wireless label switched network.

21. A network node located at a cell site and configured to forward packets between a label switching node and a base station located at the cell site, the network node comprising:
a label switching component associated with a label switched path and located at the cell site having the base station, wherein the label switching component includes:
an outgoing forwarding component configured to:
receive a first packet from the base station,
attach a first label to the first packet, wherein the first label identifies a first label switched path, and
enable communications of the labeled first packet with the label switching node; and
an incoming forwarding component configured to:
receive a second packet from the label switching node with a second label identifying at least a second label switched path,
remove the second label from the second packet, and
enable communications of the second packet with the second label removed to the base station.

22. The network node of claim 21, wherein the network node is coupled to a radio component that is located at the cell site and configured to communicate wirelessly with a mobile wireless terminal over a radio link, wherein the radio component comprises:
a receiving radio component configured to:
receive one or more radio link frames from the mobile wireless terminal,
assemble the received one or more radio link frames into the first packet, and
enable communications of the first packet with the label switching component; and
a transmitting radio component configured to:
receive the second packet from the label switching component,
segment the second packet into one or more radio link frames, and
enable communications of the one or more radio link frames associated with the second packet with the mobile wireless terminal.

23. The network node of claim 22, wherein the label switching component is co-located with the radio component.

24. The network node of claim 21, wherein each of the first packet and the second packet includes an Internet Protocol (IP) packet.

25. The network node of claim 24, wherein an IP packet includes a header section and a payload section, and wherein the header section includes at least one of a source address and a destination address.

26. The network node of claim 21, wherein the label switched path is associated with a Multiprotocol Label Switching (MPLS) network.

27. The network node of claim 26, wherein the network node is associated with a cell site gateway.

28. The network node of claim 26, wherein the network node is included in a cellular base station.

29. The network node of claim 28, wherein the base station is associated with a cellular network.

30. The network node of claim 26, wherein the label switching node is associated with a backhaul network.

31. A communications network comprising:
a label switching node that configures packets to be communicated over a label switched path by performing label switching on the packets; and
a network node located at a cell site having a base station and configured to forward packets between the label switching node and the base station, wherein the network node comprises:
a label switching component associated with the label switched path and including:
an outgoing forwarding component configured to:
receive a first packet from the base station,
attach, to the first packet, a first label that identifies a first label switched path, and
forward the labeled first packet to the label switching node; and
an incoming forwarding component configured to:
receive, from the label switching node, a second packet with a second label identifying at least a second label switched path,
remove the second label from the second packet, and
forward the second packet, without the second label, to the base station.

32. The communications network of claim 31, wherein the network node is coupled to a radio component located at the cell site that is configured to communicate wirelessly with a mobile wireless terminal over a radio link, wherein the radio component comprises:
a receiving radio component configured to:
receive one or more radio link frames from the mobile wireless terminal,
assemble the received one or more radio link frames into the first packet, and
forward the first packet to the label switching component; and a transmitting radio component configured to:
  receive the second packet from the label switching component,
  segment the second packet into one or more radio link frames, and
  forward the one or more radio link frames associated with the second packet to the mobile wireless terminal.

33. The communications network of claim 32, wherein the label switching node is configured to provide support for a handoff of the mobile wireless terminal to the base station.

34. The communications network of claim 31, wherein the network node and the base station are co-located.

35. The communications network of claim 31, wherein the label switching node is configured to provide base station control information to the network node.

36. The communications network of claim 35, wherein the network node is configured to forward base station control information provided by the label switching node to the base station.

37. The communications network of claim 31, wherein the network node is configured to forward to the base station location management information provided by the label switching node.

38. The communications network of claim 31, wherein the label switched path is determined by information using a routing protocol.

39. The communications network of claim 38, wherein the routing protocol is at least one of a link state routing protocol and a vector space routing protocol.

40. The communications network of claim 31, wherein the label switched path is established using a signaling protocol.

41. The communications network of claim 31, wherein the label switched path is determined by a topology database.

42. The communications network of claim 31, wherein the network node is configured to:
  receive two or more packets with different labels;
  perform label merging on the two or more packets; and
  based on the label merging, forward the two or more packets over a single outgoing interface with a singular label.

43. The communications network of claim 42, wherein the two or more packets are received from the base station.

44. The communications network of claim 31, wherein the label switched path is rerouted by:
  establishing a new label switched path tunnel;
  transferring traffic from the label switched path to a new label switched path; and
  removing the label switched path.

45. A system for forwarding packets between a label switching node and a base station located at a cell site, the system comprising:
  a network node comprising a label switching component associated with a label switched path and located at the cell site having the base station, wherein the label switching component includes:
    a first instruction module including instructions that are executable by a first processor and configured to cause the first processor to perform operations including:
      receiving a first packet from the base station;
      attaching a first label to the first packet, wherein the first label identifies a first label switched path; and
      enabling communications of the labeled first packet with the label switching node;
    means for receiving a second packet from the label switching node with a second label identifying at least a second label switched path; and
    a second instruction module including instructions that are executable by a second processor and configured to cause the second processor to perform operations including:
      removing the second label from the second packet; and
      enabling communications of the second packet with the second label removed to the base station.

46. The system of claim 45, wherein the network node includes a radio component that is located at the cell site and configured to communicate wirelessly with a mobile wireless terminal over a radio link, the radio component comprising:
  a third instruction module including instructions that are executable by a third processor and configured to cause the third processor to perform operations including:
    receiving one or more radio link frames from the mobile wireless terminal;
    assembling the received one or more radio link frames into the first packet; and
    enabling communications of the first packet with the label switching component; and
  a fourth instruction module including instructions that are executable by a fourth processor and configured to cause the third processor to perform operations including:
    receiving the second packet from the label switching component;
    segmenting the second packet into one or more radio link frames; and
    enabling communications of the one or more radio link frames associated with the second packet with the mobile wireless terminal.

47. The system of claim 46, wherein the label switching component is co-located with the radio component.

48. The system of claim 45, wherein each of the first packet and the second packet includes an Internet Protocol (IP) packet.

49. The system of claim 48, wherein an IP packet includes a header section and a payload section, and wherein the header section includes at least one of a source address and a destination address.

50. The system of claim 45, wherein the label switched path is associated with a Multiprotocol Label Switching (MPLS) network.

51. The system of claim 45, wherein the network node is associated with a cell site gateway.

52. The system of claim 45, wherein the network node is included in a cellular base station.

53. The system of claim 45, wherein the base station is associated with a cellular network.

54. The system of claim 45, wherein the label switching node is associated with a backhaul network.

55. A system comprising:
  a label switching node that configures packets to be communicated over a label switched path by performing label switching on the packets; and
  a network node located at a cell site having a base station and configured to forward packets between the label switching node and the base station, wherein the network node comprises a label switching component associated with the label switched path and including:
    a first instruction module including instructions that are executable by a first processor and configured to cause the first processor to perform operations including:
      receiving a first packet from the base station;
      attaching, to the first packet, a first label that identifies a first label switched path; and forwarding the labeled first packet to the label switching node;

means for receiving, from the label switching node, a second packet with a second label identifying at least a second label switched path; and a second instruction module including instructions that are executable by a second processor and configured to cause the second processor to perform operations including:

removing the second label from the second packet; and forwarding the second packet, without the second label to the base station.

56. The system of claim 55, wherein the network node is coupled to a radio component located at the cell site that is configured to communicate wirelessly with a mobile wireless terminal over a radio link, the radio component comprising:

a third instruction module including instructions that are executable by a third processor and configured to cause the third processor to perform operations including:

receiving one or more radio link frames from the mobile wireless terminal;

assembling the received one or more radio link frames into the first packet; and forwarding the first packet to the label switching component; and a fourth instruction module including instructions that are executable by a fourth processor and configured to cause the third processor to perform operations including:

receiving the second packet from the label switching component;

segmenting the second packet into one or more radio link frames; and forwarding the one or more radio link frames associated with the second packet to the mobile wireless terminal.

57. The system of claim 55, wherein the network node and the base station are co-located.

58. The system of claim 55, wherein the label switching node is configured to provide base station control information to the network node.

59. The system of claim 58, wherein the network node is configured to forward base station control information provided by the label switching node to the base station.

60. The system of claim 56, wherein the label switching node is configured to provide support for a handoff of the mobile wireless terminal to the base station.

61. The system of claim 55, wherein the network node is configured to forward to the base station location management information provided by the label switching node.

62. The system of claim 55, wherein the label switched path is determined by information using a routing protocol.

63. The system of claim 62, wherein the routing protocol is at least one of a link state routing protocol and a vector space routing protocol.

64. The system of claim 55, wherein the label switched path is established using a signaling protocol.

65. The system of claim 55, wherein the label switched path is determined by a topology database.

66. The system of claim 55, wherein at least one of the first instruction module and the second instruction module includes instructions that are configured to cause the respective first processor or the second processor to perform operations including:

receiving two or more packets with different labels;

performing label merging on the two or more packets; and based on the label merging, forwarding the two or more packets over a single outgoing interface with a singular label.

67. The system of claim 66, wherein the two or more packets are received from the base station.

68. The system of claim 55, wherein the label switching node is configured to reroute the label switched path by:

establishing a new label switched path tunnel;

transferring traffic from the label switched path to the new label switched path; and removing the label switched path.

* * * * *